United States Patent
Cheng et al.

(10) Patent No.: US 11,312,175 B2
(45) Date of Patent: Apr. 26, 2022

(54) AUTOMOBILE HUB OF MULTILAYER RIM, HUB ASSEMBLING METHOD AND AUTOMOBILE

(71) Applicant: CITIC Dicastal CO., LTD., Hebei (CN)

(72) Inventors: Chuan Cheng, Qinhuangdao (CN); Changhai Li, Qinhuangdao (CN); Xu Wang, Qinhuangdao (CN); Hongbiao Li, Qinhuangdao (CN); Zhen Li, Qinhuangdao (CN); Yule Zhou, Qinhuangdao (CN); Zenglei He, Qinhuangdao (CN)

(73) Assignee: CITIC Dicastal CO., LTD., Qinhuangdao (CN)

( * ) Notice: Subject to any disclaimer, the term of this patent is extended or adjusted under 35 U.S.C. 154(b) by 347 days.

(21) Appl. No.: 16/550,615

(22) Filed: Aug. 26, 2019

(65) Prior Publication Data

US 2020/0254812 A1 Aug. 13, 2020

(30) Foreign Application Priority Data

Feb. 11, 2019 (CN) .......................... 201910110052.7

(51) Int. Cl.
*B60B 25/02* (2006.01)
*B60B 3/04* (2006.01)
*B60B 25/00* (2006.01)

(52) U.S. Cl.
CPC .............. *B60B 25/02* (2013.01); *B60B 3/041* (2013.01); *B60B 25/004* (2013.01); *B60B 2360/104* (2013.01); *B60B 2900/111* (2013.01); *B60B 2900/131* (2013.01); *B60B 2900/572* (2013.01)

(58) Field of Classification Search
CPC ......... B60B 25/02; B60B 25/004; B60B 3/04; B60B 3/041; B60B 3/044
See application file for complete search history.

(56) References Cited

U.S. PATENT DOCUMENTS

| | | | | |
|---|---|---|---|---|
| 3,235,312 | A * | 2/1966 | Hollander | B60B 3/02 301/63.105 |
| 5,380,071 | A * | 1/1995 | Kier, Jr. | B60B 3/02 301/10.1 |
| 5,718,485 | A * | 2/1998 | Stach | B60B 3/002 228/114.5 |
| 5,997,102 | A * | 12/1999 | Stanavich | B60B 3/005 29/894.322 |
| 6,447,071 | B1 * | 9/2002 | Griffin | B60B 3/02 29/894.322 |

(Continued)

FOREIGN PATENT DOCUMENTS

| | | | |
|---|---|---|---|
| CN | 103342083 A | 10/2013 | |
| CN | 103342083 B | 7/2015 | |
| CN | 209534631 U * | 10/2019 | ............... B60B 3/04 |

(Continued)

*Primary Examiner* — Jason R Bellinger
(74) *Attorney, Agent, or Firm* — Syncoda LLC; Feng Ma (57) ABSTRACT

An automobile wheel having a multilayer rim includes a wheel disc and a rim that is composed of at least two layers of metal rings by nesting, and a gap is preset between two adjacent metal rings; an outer side of one end of the wheel disc includes axial rim mounting grooves, and one end of the rim is inserted into the rim mounting grooves to fix the rim to the wheel disc.

5 Claims, 9 Drawing Sheets

(56) References Cited

U.S. PATENT DOCUMENTS

| | | | | |
|---|---|---|---|---|
| 6,547,341 B1 * | 4/2003 | Griffin | ...................... | B60B 3/02 |
| | | | | 29/894.322 |
| 2002/0057009 A1 * | 5/2002 | Mikami | ................. | B23K 33/00 |
| | | | | 301/5.1 |

FOREIGN PATENT DOCUMENTS

| CN | 209666732 U | * | 11/2019 | ............... B60B 3/04 |
| DE | 10030314 A1 | * | 1/2002 | ............... B60B 3/02 |
| EP | 3683067 A1 | * | 7/2020 | ............... B60B 5/02 |
| WO | WO-2010018531 A1 | * | 2/2010 | ............... B60B 3/06 |

* cited by examiner

AUTOMOBILE HUB OF MULTILAYER RIM, HUB ASSEMBLING METHOD AND AUTOMOBILE

CROSS-REFERENCE TO RELATED APPLICATION

The present application claims benefit of Chinese Patent Application No. 201910110052.7, filed on Feb. 11, 2019, the contents of which are hereby incorporated by reference in their entirety.

BACKGROUND

Aluminum alloy wheels have been widely applied in the passenger car market due to the characteristics of attractive appearance, safety, comfort and the like. Specifically, the aluminum alloy wheels have the following advantages:

1) light weight, thus achieving low deformation and small inertial resistance during high-speed rotation;

2) better metal characteristics of absorbing vibration and rebounding force, thus reducing the vibration during driving;

3) good cutting performance, thus obtaining higher dimensional accuracy; high roundness, low runout and balance, causing the automobile to be driven smoothly and comfortably; and 4) diverse color and delicacy after corrosion-resistant treatment and coloring.

However, the conventional wheels are mostly manufactured with a single-layer hub structure. In order to achieve higher strength, the wheels are relatively thick, so that the entire wheels are still heavy, and the advantage of light weight of aluminum alloy cannot be fully exerted.

SUMMARY

The present disclosure relates to a motor vehicle wheel technology, in particular to an automobile wheel having a multilayer rim, a wheel assembling method and an automobile.

In view of above, embodiments of the present disclosure are desired to provide an automobile wheel having a multilayer rim, a wheel assembling method and an automobile, where the weight of the wheel is further reduced and the wheel has sufficient strength.

In order to achieve the above objective, the technical solution of the present disclosure is implemented as follows:

Embodiments of the present disclosure provide an automobile wheel having a multilayer rim, the wheel includes a wheel disc and a rim that is composed of at least two layers of metal rings by nesting, and a gap is preset between two adjacent metal rings; an outer side of one end of the wheel disc includes axial rim mounting grooves, and one end of the rim is inserted into the rim mounting grooves to fix the rim to the wheel disc.

In the above solution, the rim is composed of two metal rings of an outer rim and an inner rim by nesting, and the outer side of one end of the wheel disc includes two rim mounting grooves; one end of the outer rim and one end of the inner rim are respectively inserted into the rim mounting grooves to fix the rim to the wheel disc.

In the above solution, the wheel disc and the rim are made of aluminum alloy.

In the above solution, the outer rim and the inner rim each have a thickness of more than 0.8 mm and less than 2 mm, and the sum of the thicknesses of the two is not less than 2.8 mm.

In the above solution, the rim mounting grooves each have a width of 0.5-2.5 mm and a depth of 1-10 mm.

The embodiments of the present disclosure also provide a method for assembling an automobile wheel having a multilayer rim, including the following steps:

nesting a plurality of metal rings with each other;

fixing one ends of the plurality of metal rings nested to each other to form a rim; and inserting the other end of the rim into rim mounting grooves of a wheel disc and fixing, and presetting a gap between two adjacent metal rings and at a preset portion.

In the above solution, fixing one ends of the plurality of metal rings nested to each other includes:

fixing one ends of the plurality of metal rings nested to each other by welding.

In the above solution, inserting the other end of the rim into the rim mounting grooves of the wheel disc and fixing includes:

inserting the other end of the rim into the rim mounting grooves of the wheel disc and fixing by welding.

In the above solution, before nesting the plurality of metal rings with each other, the method further includes:

machining the other end of the rim and the rim mounting grooves to preset sizes by mechanical cutting.

The embodiments of the present disclosure also provide an automobile, including a body and wheels, the wheel including any automobile wheel having a multilayer rim described above.

The automobile wheel having the multilayer rim includes a wheel disc and a rim that is composed of at least two layers of metal rings by nesting, and a gap is preset between two adjacent metal rings; an outer side of one end of the wheel disc includes axial rim mounting grooves, and one end of the rim is inserted into the rim mounting grooves to fix the rim to the wheel disc. Hence, the automobile wheel having the multilayer rim, the wheel assembling method and the automobile according to the embodiments of the present disclosure have the advantages that the weight of the wheel can be further reduced and the wheel has sufficient strength through the rim composed of at least two layers of metal rings by nesting.

Other advantageous effects of the embodiments of the present disclosure will be further described in conjunction with specific technical solutions in the specific embodiments.

BRIEF DESCRIPTION OF DRAWINGS

To describe the technical solutions of the embodiments of the present disclosure more clearly, the accompanying drawings required for describing the embodiments will be described briefly below. It should be understood that the drawings described below are only some of the drawings of the present disclosure, and other drawings may also be obtained by a person skilled in the art according to the drawings without any creative efforts.

DETAILED DESCRIPTION

It should be noted that, in the description of the embodiments of the present disclosure, unless otherwise stated and limited, the term "connected" shall be understood broadly, for example, it may be an electrical connection, an internal communication between two components, a direct connection, or an indirect connection by an intermediate medium, and the specific meaning of the term may be understood by a person skilled in the art according to the specific circumstances.

It should be noted that, the terms "first\second\third" involved in the embodiments of the present disclosure are only intended to distinguish similar objects, but do not represent specific orders of the objects, and understandably, the "first\second\third" may be interchanged in a specific order or a consecutive order.

Embodiments of the present disclosure provide an automobile wheel having a multilayer rim, the wheel includes a wheel disc and a rim that is composed of at least two layers of metal rings by nesting, and a gap is preset between two adjacent metal rings; an outer side of one end of the wheel disc includes axial rim mounting grooves, and one end of the rim is inserted into the rim mounting grooves to fix the rim to the wheel disc.

The wheel disc includes a flange, a peripheral portion of the flange, spokes, etc., and details are not described here.

The nesting indicates that outer-layer metal rings are sleeved outside inner-layer metal rings, but a gap is preset between two adjacent metal rings. Compared with a single-layer rim, the multiple layers of metal rings are lighter in the case of the same thickness. Because the multiple individual metal rings are thin and have finer grains in the casting, the overall strength and other mechanical properties after combination are superior to those of the single-layer rim.

The size of the preset gap is determined by the factors such as the strength of the material, the wall thickness requirement of the casting, and the overall size of the automobile wheel. For details, reference may be made to specific embodiments.

The automobile wheel having the multilayer rim according to the embodiments of the present disclosure includes a rim composed of at least two layers of metal rings by nesting, so that the weight of the wheel can be further reduced, and the wheel has sufficient strength.

In an embodiment, the rim may be composed of two metal rings of an outer rim and an inner rim by nesting, and the outer side of one end of the wheel disc includes two rim mounting grooves; one end of the outer rim and one end of the inner rim are respectively inserted into the rim mounting grooves to fix the rim to the wheel disc. In this way, the structure is simpler and the weight can be reduced much. It can be understood that more than two metal rings are also feasible.

In an embodiment, the wheel disc and the rim may be made of aluminum alloy. The aluminum alloy is lighter, and is the mainstream configuration of motor vehicles such as passenger cars that require high acceleration. It can be understood that other metal materials, such as steel, iron, copper and other metals having certain strength are feasible.

In an embodiment, the outer rim and the inner rim may each have a thickness of more than 0.8 mm, and the sum of the thicknesses of the two may be not less than 2.8 mm. In this way, the weight can be reduced, and sufficient strength can be obtained, so this embodiment is a preferred one.

In an embodiment, the outer rim and the inner rim may each have a thickness of less than 2 mm. Thus, it is a preferred embodiment to avoid too large total thickness that cannot achieve the purpose of reducing the weight.

In an embodiment, the rim mounting grooves may each have a width of 0.5-2.5 mm and a depth of 1-10 mm. Thus, it is preferable to mount the outer rim and the inner rim firmly.

The embodiments of the present disclosure also provide a method for assembling an automobile wheel having a multilayer rim, including the following steps:

nesting a plurality of metal rings with each other;

fixing one ends of the plurality of metal rings nested to each other to form a rim; and inserting the other end of the rim into rim mounting grooves of a wheel disc and fixing, and presetting a gap between two adjacent metal rings and at a preset portion.

In an embodiment, fixing one ends of the plurality of metal rings nested to each other may include:

fixing one ends of the plurality of metal rings nested to each other by welding. In the manufacturing of an automobile wheel, the welding fixing process is relatively mature, and the structure is simple and has certain sealing performance, so this embodiment is a preferred one.

In an embodiment, inserting the other end of the rim into the rim mounting grooves of the wheel disc and fixing may include:

inserting the other end of the rim into the rim mounting grooves of the wheel disc and fixing by welding.

In an embodiment, before nesting the plurality of metal rings with each other, the method may further include:

machining the other end of the rim and the rim mounting grooves to preset sizes by mechanical cutting. In this way, the mounting positions of the rim and the wheel disc are more accurate and firmer, so this embodiment is a preferred one.

The embodiments of the present disclosure also provide an automobile, including a body and wheels, the wheel including any automobile wheel having a multilayer rim described above. The automobile equipped with such wheels has lower fuel consumption.

The present disclosure will be described in detail below with reference to the accompanying drawings and specific embodiments. It should be understood that the specific embodiments described herein are merely used for interpreting the present disclosure, rather than limiting the present disclosure. In addition, the embodiments described below are only part of the embodiments of the present disclosure, not all of them. All other embodiments obtained by a person skilled in the art based on these embodiments without any creative efforts fall into the scope of the present disclosure.

First Embodiment

Figure 1:
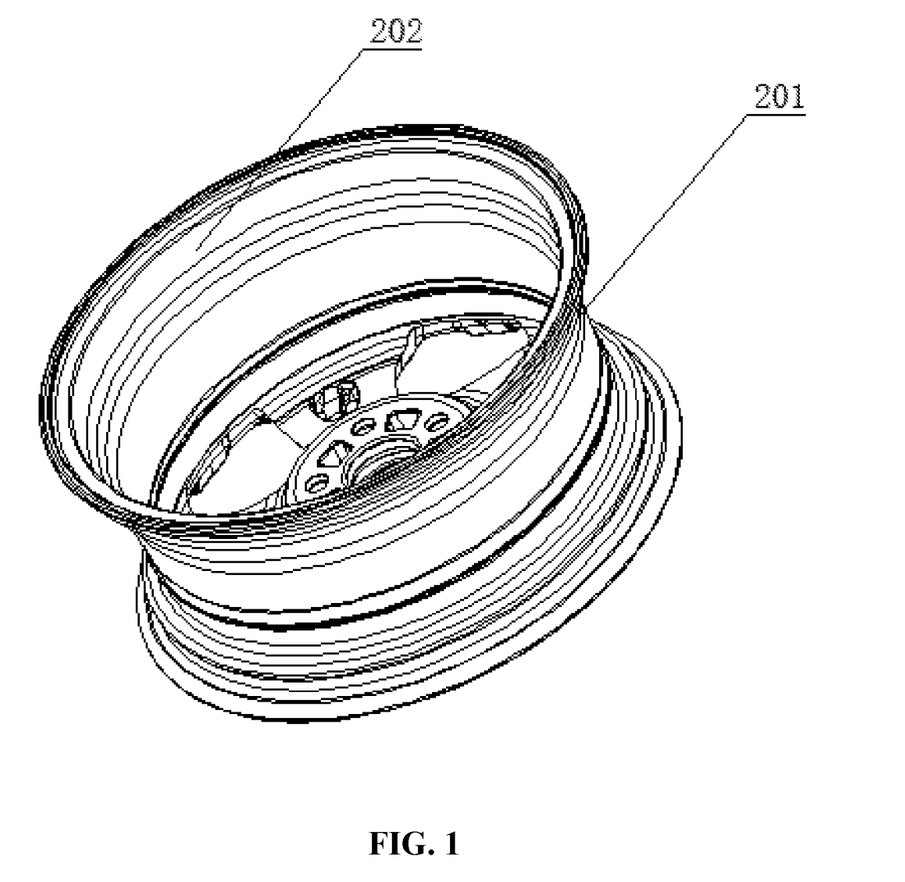
FIG. 1 is a schematic diagram of an aluminum alloy wheel of a double-layer rim according to a first embodiment of the present disclosure.
Figure 2:
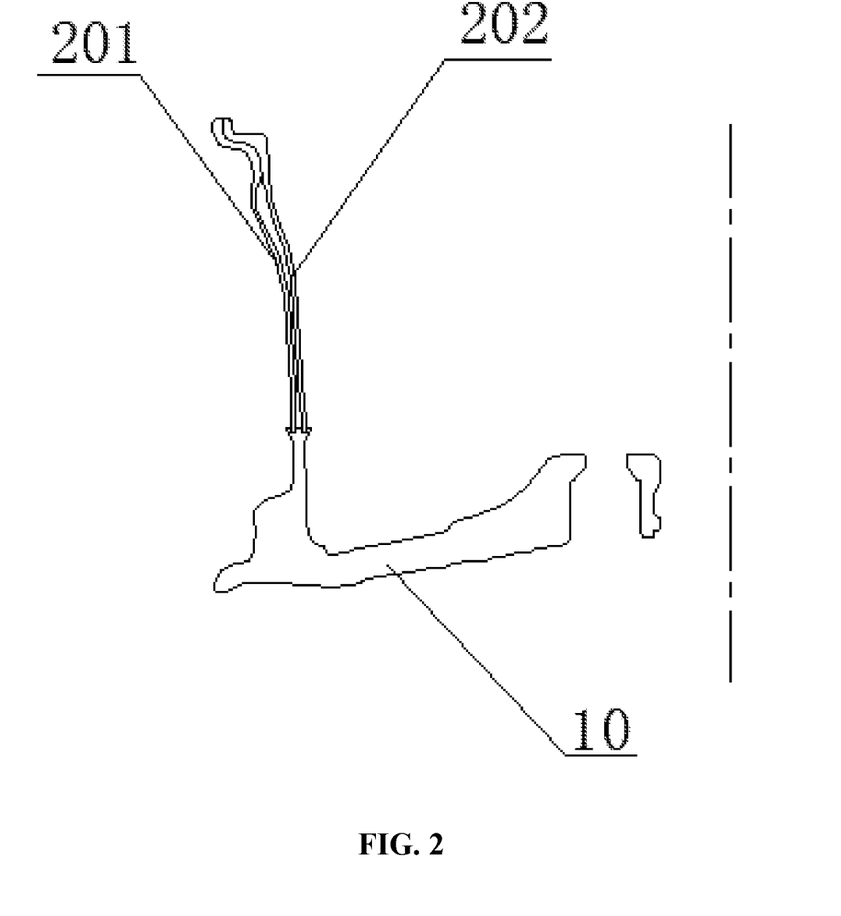
FIG. 2 is a semi-sectional view of an aluminum alloy wheel of a double-layer rim according to a first embodiment of the present disclosure.

FIG. 1 is a schematic diagram of an aluminum alloy wheel of a double-layer rim according to First embodiment of the present disclosure, and FIG. 2 is a semi-sectional view of FIG. 1. In this embodiment, the automobile wheel having the multilayer rim is an aluminum alloy wheel of a double-layer rim. It can be understood that the structural principle of the embodiment of the present disclosure may also be applied to rims of two or more layers and aluminum alloy wheels of other materials.

Figure 3:
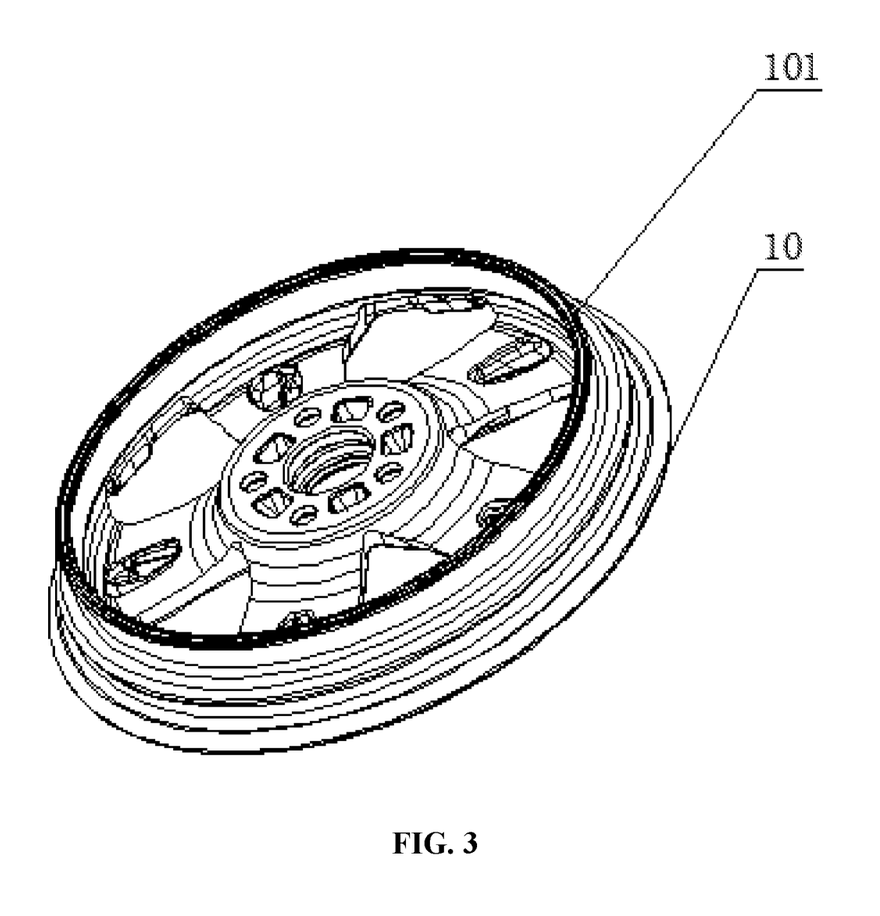
FIG. 3 is a schematic diagram of a wheel disc in the aluminum alloy wheel of the double-layer rim according to the first embodiment of the present disclosure.
Figure 4:
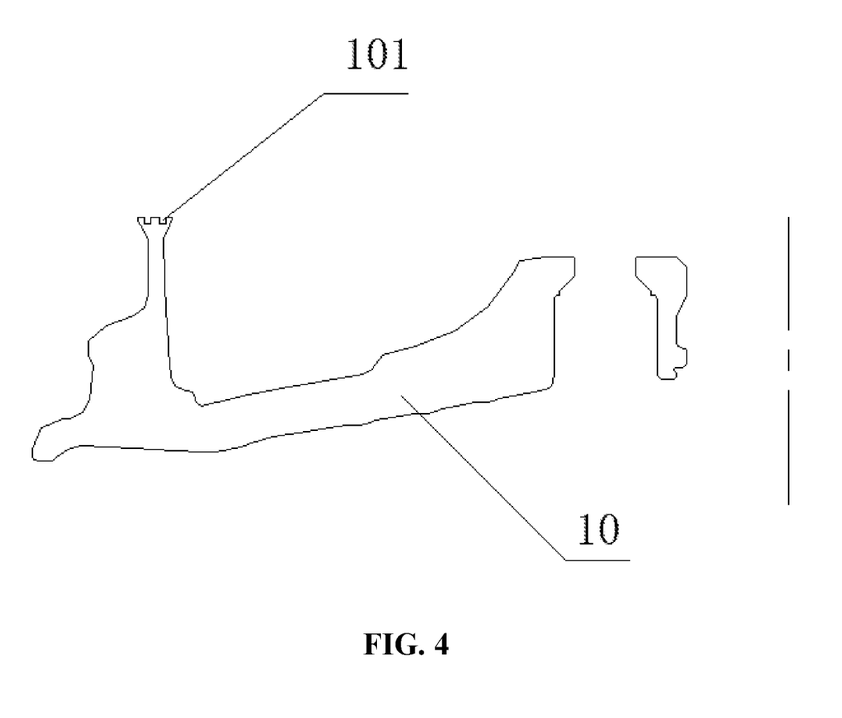
FIG. 4 is a semi-sectional view of the wheel disc in the aluminum alloy wheel of the double-layer rim according to the first embodiment of the present disclosure.
Figure 5:
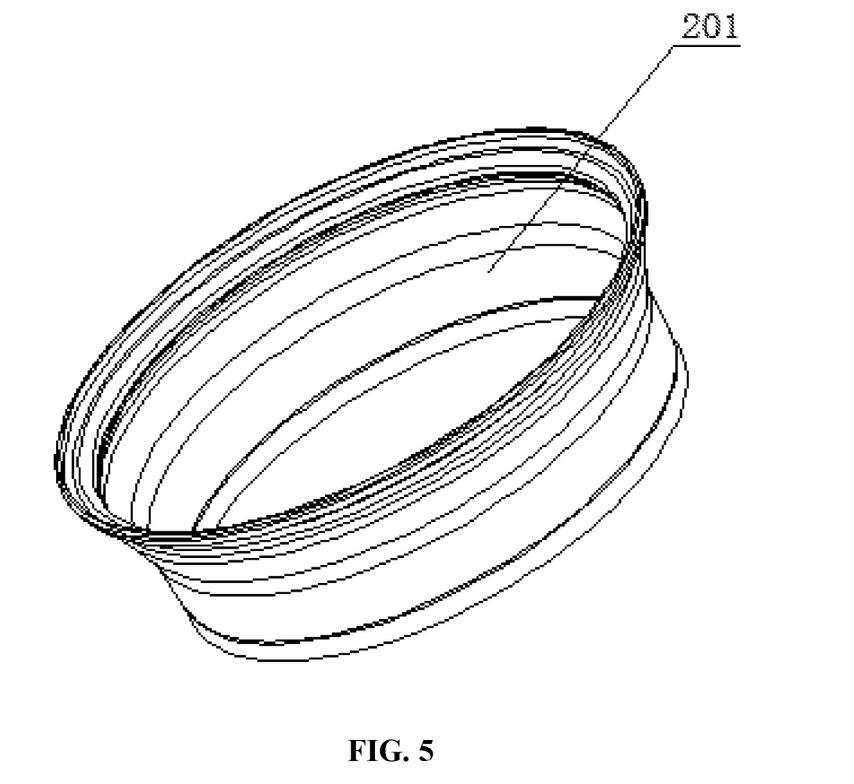
FIG. 5 is a schematic diagram of an outer rim in the aluminum alloy wheel of the double-layer rim according to first embodiment of the present disclosure.
Figure 6:
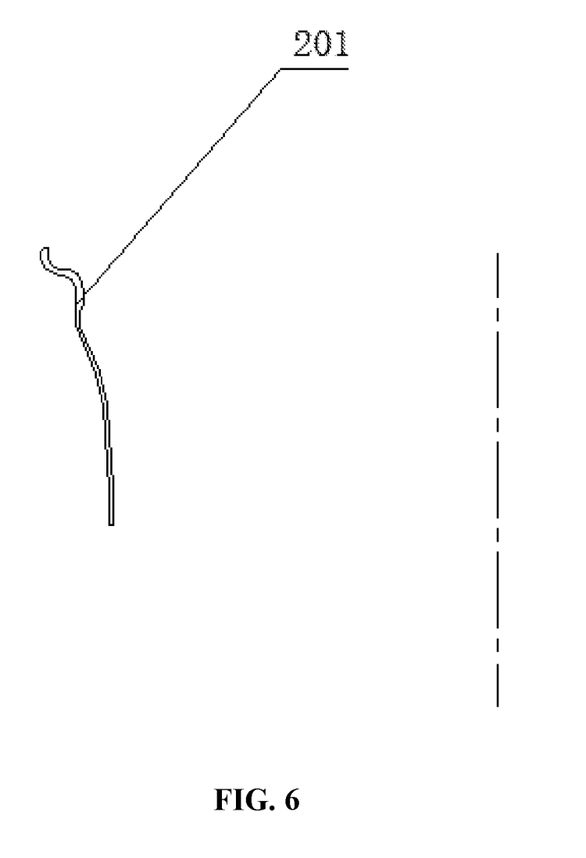
FIG. 6 is a semi-sectional view of the outer rim in the aluminum alloy wheel of the double-layer rim according to first embodiment of the present disclosure.
Figure 7:
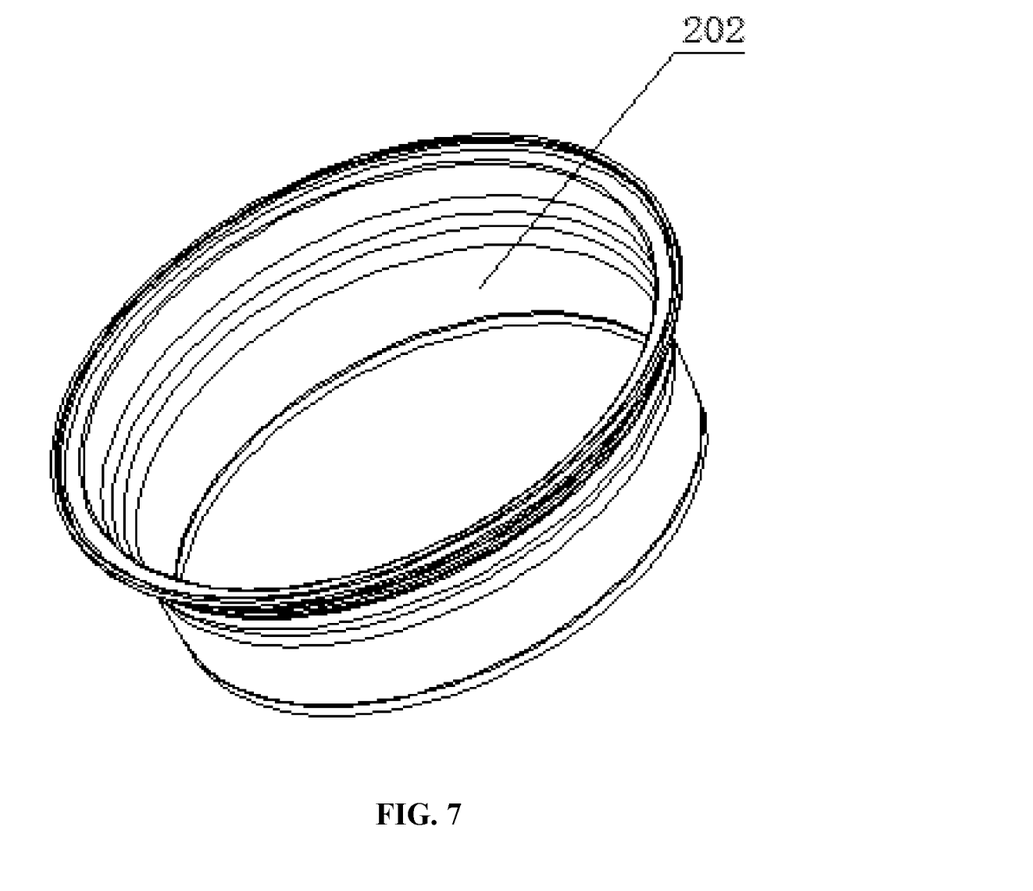
FIG. 7 is a schematic diagram of an inner rim in the aluminum alloy wheel of the double-layer rim according to first embodiment of the present disclosure.
Figure 8:
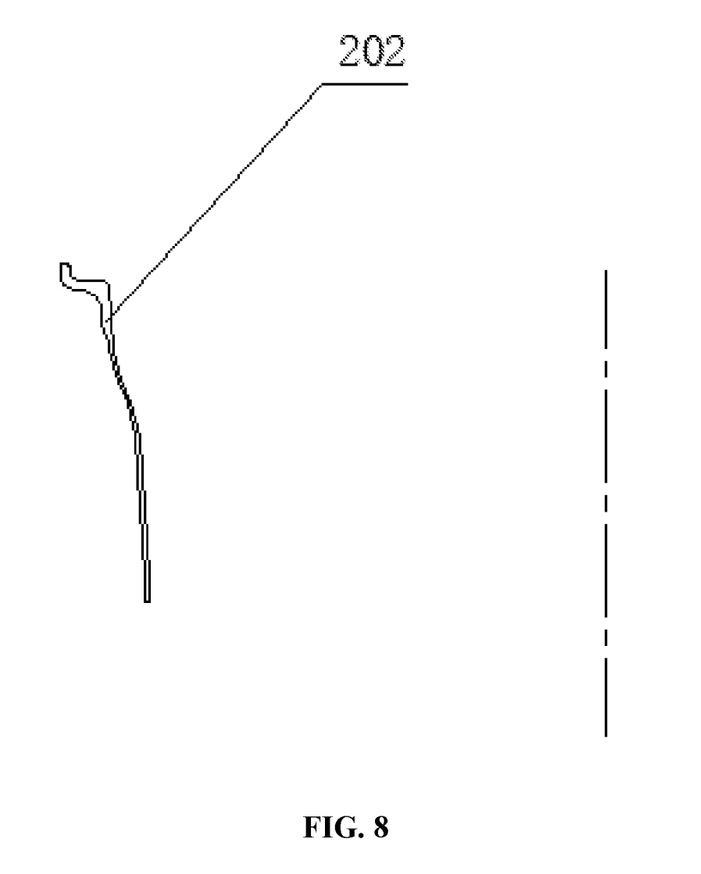
FIG. 8 is a semi-sectional view of the inner rim in the aluminum alloy wheel of the double-layer rim according to first embodiment of the present disclosure.

As shown in FIGS. 1 and 2, the wheel includes a wheel disc 10 and a rim, and the rim is composed of two metal rings of an outer rim 201 and an inner rim 202. As shown in FIGS. 3 and 4, the outer side of one end of the wheel disc 10 includes two rim mounting grooves 101. One end of the outer rim 201 and one end of the inner rim 202 are respectively inserted into the rim mounting grooves 101 to fix the rim to the wheel disc 10. In this embodiment, as shown in FIG. 5-8, the inner rim 202 has a thickness of 2 mm, the outer rim 201 has a thickness of 2 mm, and the rim mounting grooves 101 have a width of 2 mm and a depth of 4 mm. The gap between the outer rim 201 and the inner rim 202 is non-uniform, and the gap at the widest portion is 2 mm.

It should be noted that, for the sake of clear expression, the scales of FIGS. 1-8 are different, and are often enlarged in the semi-sectional views.

Second Embodiment

In this embodiment, except that the thicknesses of the outer rim 201 and the inner rim 202, and the width and depth of the rim mounting grooves 101 are different from those of First embodiment, others are the same as those of First embodiment. The following details describe the thicknesses of the outer rim 201 and the inner rim 202, and the width and depth of the rim mounting grooves 101.

In this embodiment, the inner rim 202 has a thickness of 2 mm, the outer rim 201 has a thickness of 1.5 mm, and the rim mounting grooves 101 have widths of 2 mm and 1.5 mm and a depth of 4 mm. The gap between the outer rim 201 and the inner rim 202 is non-uniform, and the gap at the widest portion is 2.5 mm.

Third Embodiment

In this embodiment, except that the thicknesses of the outer rim 201 and the inner rim 202, and the width and depth of the rim mounting grooves 101 are different from those of First embodiment, others are the same as those of First embodiment. The following details describe the thicknesses of the outer rim 201 and the inner rim 202, and the width and depth of the rim mounting grooves 101.

In this embodiment, the inner rim 202 has a thickness of 2 mm, the outer rim 201 has a thickness of 2 mm, and the rim mounting grooves 101 have a width of 2 mm and a depth of 5 mm. The gap between the outer rim 201 and the inner rim 202 is non-uniform, and the gap at the widest portion is 2 mm.

Fourth Embodiment

In this embodiment, except that the thicknesses of the outer rim 201 and the inner rim 202, and the width and depth of the rim mounting grooves 101 are different from those of First embodiment, others are the same as those of First embodiment. The following details describe the thicknesses of the outer rim 201 and the inner rim 202, and the width and depth of the rim mounting grooves 101.

In this embodiment, the inner rim 202 has a thickness of 2 mm, the outer rim 201 has a thickness of 1.5 mm, and the rim mounting grooves 101 have widths of 2 mm and 1.5 mm and a depth of 5 mm. The gap between the outer rim 201 and the inner rim 202 is non-uniform, and the gap at the widest portion is 2.5 mm.

Fifth Embodiment

In this embodiment, except that the thicknesses of the outer rim 201 and the inner rim 202, and the width and depth of the rim mounting grooves 101 are different from those of First embodiment, others are the same as those of First embodiment. The following details describe the thicknesses of the outer rim 201 and the inner rim 202, and the width and depth of the rim mounting grooves 101.

In this embodiment, the inner rim 202 has a thickness of 0.8 mm, the outer rim 201 has a thickness of 2 mm, and the rim mounting grooves 101 have widths of 0.8 mm and 2 mm and a depth of 4 mm. The gap between the outer rim 201 and the inner rim 202 is non-uniform, and the gap at the widest portion is 3.2 mm.

Sixth Embodiment

In this embodiment, except that the thicknesses of the outer rim 201 and the inner rim 202, and the width and depth of the rim mounting grooves 101 are different from those of First embodiment, others are the same as those of First embodiment. The following details describe the thicknesses of the outer rim 201 and the inner rim 202, and the width and depth of the rim mounting grooves 101.

In this embodiment, the inner rim 202 has a thickness of 2 mm, the outer rim 201 has a thickness of 0.8 mm, and the rim mounting grooves 101 have widths of 2 mm and 0.8 mm and a depth of 5 mm. The gap between the outer rim 201 and the inner rim 202 is non-uniform, and the gap at the widest portion is 3.2 mm.

The wheels of the above embodiments were respectively tested about wheel strengths and fatigues including 13-degree impact strength, 90-degree impact strength, radial impact, radial fatigue, bending fatigue and the like. The tests show that the wheels of the above embodiments all meet American wheel SAE J175 and SAE J328-2005 standards, namely meet the performance requirements for 13-degree impact strength, radial fatigue and bending fatigue, and also meet the requirements of national standards GB/T 5334-2005 and GB/T 15704-1995 for wheel strengths and fatigues.

Seventh Embodiment

Figure 9:
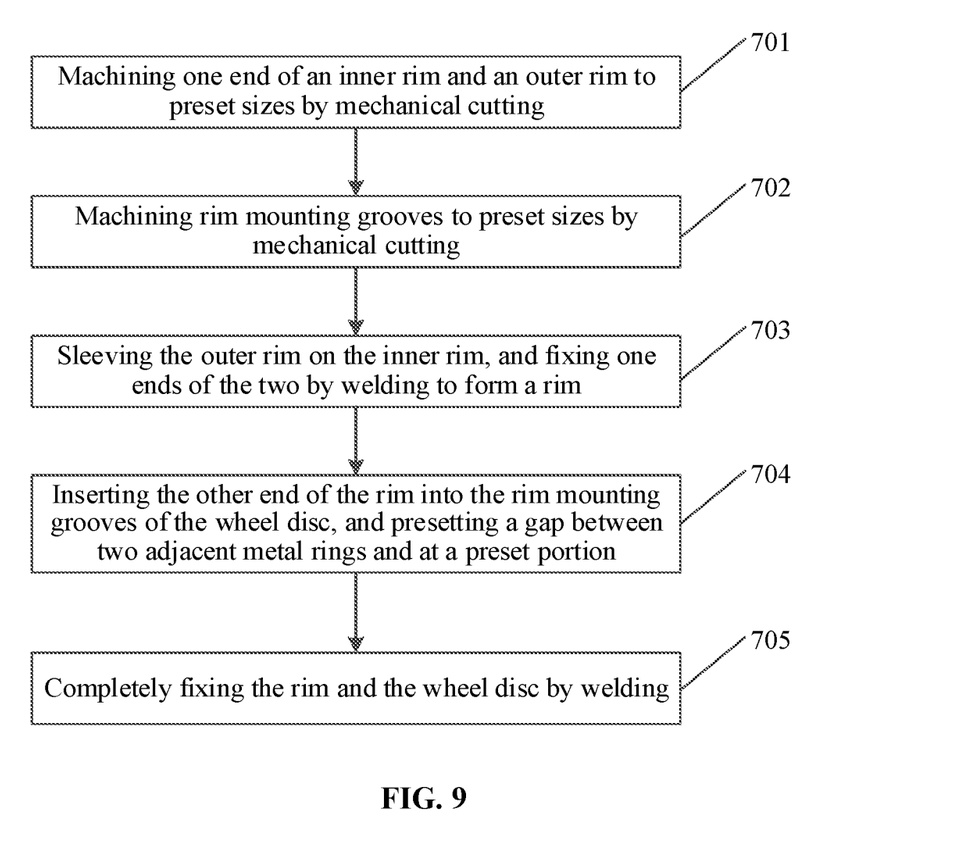
FIG. 9 is a schematic flowchart of a method for assembling an aluminum alloy wheel of a double-layer rim of the present disclosure.

This embodiment provides a method for assembling an aluminum alloy wheel of a double-layer rim. As shown in FIG. 9, the method includes the following steps:

In step 701: one end of an inner rim and an outer rim are machined to preset sizes by mechanical cutting, that is, respective one end mounted to a wheel disc is mechanically cut, because the dimensional accuracy of casting is not high enough;

In step 702: rim mounting grooves are machined to preset sizes by mechanical cutting, where the dimensional accuracy of casting is also not high enough;

Through steps 701 and 702, the mounting positions of the rim and the wheel disc are more accurate and firmer;

In step 703: the outer rim is sleeved on the inner rim, and one ends of the two are fixed by welding, that is, the ends not mounted to the wheel disc are fixed to each other to form a rim;

In step 704: the other end of the rim is inserted into the rim mounting grooves of the wheel disc, and the presetting a gap between two adjacent metal rings and at a preset portion; the preset gap here may be any gap in first embodiment to sixth embodiment; due to pre-machining, the rim is inserted into the wheel disc and can be initially fixed;

In step 705: the rim and the wheel disc are completely fixed by welding; in the manufacturing of the automobile wheel, the welding fixing process is relatively mature, and the structure is simple and has certain sealing performance, so this embodiment is a preferred one.

Eighth Embodiment

This embodiment provides a passenger car, including a body and wheels, where each wheel may include an aluminum alloy wheel of a double-layer rim according to any one of first embodiment to sixth embodiment;

The aluminum alloy wheel of the double-layer rim in this embodiment can be obtained by the assembling method described in seventh embodiment.

The foregoing descriptions are merely preferred embodiments of the present disclosure, but are not intended to limit the protection scope of the present disclosure. Any modifications, equivalent substitutions, improvements and the like made within the spirit and principle of the present disclosure shall fall within the protection scope of the present disclosure.

The invention claimed is:

1. An automobile wheel having a multilayer rim, wherein the wheel comprises a wheel disc and a rim that is composed of two layers of metal rings by nesting, a gap is preset between the two adjacent metal rings; an outer side of one end of the wheel disc comprises axial rim mounting grooves, and one end of the rim is inserted into the rim mounting grooves to fix the rim to the wheel disc.

2. The automobile wheel having a multilayer rim according to claim 1, wherein the rim is composed of two metal rings of an outer rim and an inner rim by nesting, and the outer side of one end of the wheel disc comprises two rim mounting grooves; one end of the outer rim and one end of the inner rim are respectively inserted into the rim mounting grooves to fix the rim to the wheel disc.

3. The automobile wheel having a multilayer rim according to claim 2, wherein the wheel disc and the rim are made of aluminum alloy.

4. The automobile wheel having a multilayer rim according to claim 2, wherein the outer rim and the inner rim each have a thickness of more than 0.8 mm and less than 2 mm, and the sum of the thicknesses of the outer rim and the inner rim is not less than 2.8 mm.

5. The automobile wheel having a multilayer rim according to claim 4, wherein the rim mounting grooves have a width of 0.5-2.5 mm and a depth of 1-10 mm.

* * * * *